Jan. 22, 1957  A. R. MORRISON  2,778,764
METHOD OF SIZING GLASS FIBERS TO FORM STRANDS
Filed Sept. 13, 1951.
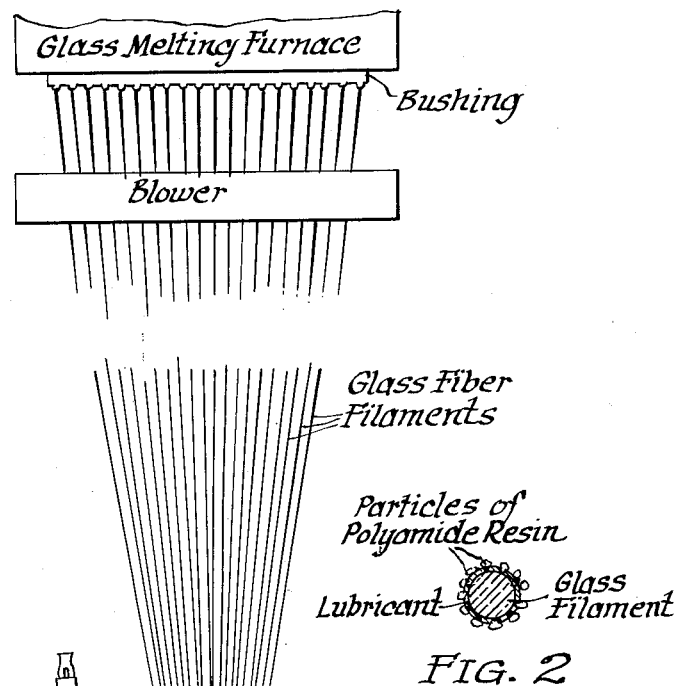
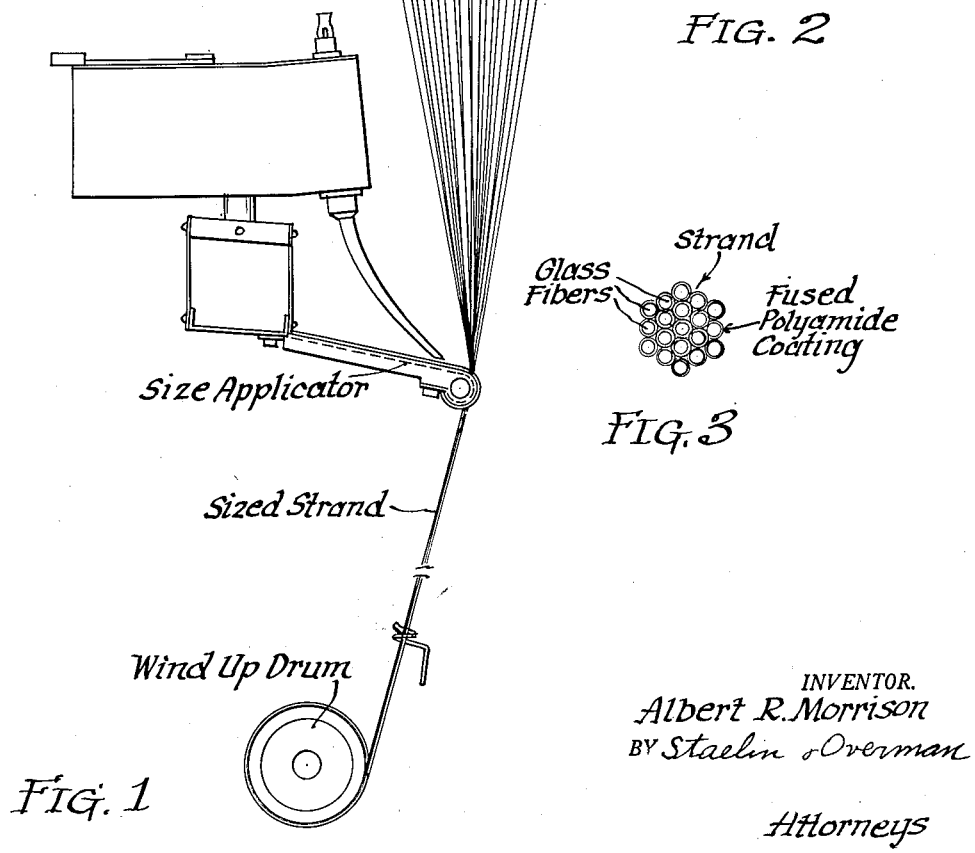
INVENTOR.
Albert R. Morrison
BY Staelin & Overman
Attorneys

United States Patent Office 2,778,764
Patented Jan. 22, 1957

2,778,764

METHOD OF SIZING GLASS FIBERS TO FORM STRANDS

Albert R. Morrison, Newark, Ohio, assignor to Owens-Corning Fiberglas Corporation, a corporation of Delaware Application September 13, 1951, Serial No. 246,504

10 Claims. (Cl. 154—91)

This invention relates to articles of manufacture formed with glass fibers and it relates more particularly to yarns and strands of glass fibers sized with a cationic polyamide resinous material and to a method for producing the same.

An object of this invention is to produce and to provide a method for producing glass fibers in the form of yarns or strands fabricated of a plurality of glass fiber filaments sized, preferably while being formed, with a polyamide resin.

For purposes of illustration, but not of limitation, schematic drawings are submitted herewith showing the manufacture of the elements described and claimed in which:

Figure 1 is a schematic elevational view of the apparatus for forming and sizing of continuous glass fibers in the manufacture of a strand;

Figure 2 is an enlarged sectional view of a sized glass fiber filament, and

Figure 3 is a schematic sectional view of a strand formed in the practice of this invention showing only a portion of the fibrous elements therein.

The technique for sizing glass fibers in forming is fully disclosed in the Biefeld Patent No. 2,392,805 which issued on January 15, 1946. As described in said patent, a plurality of molten glass streams issuing simultaneously from hundreds of openings in the underside of a bushing of a glass melting furnace are attenuated simultaneously into fine filaments by a winding drum about which the filaments are wound after they are gathered together to form a bundle. As many as two hundred to three hundred filaments may be simultaneously drawn in the manner described from one or more bushings and combined to form a strand. As the filaments are gathered together, a size may be applied as by a roll applicator or by a wiper pad.

Various compositions have been applied as the size for glass fibers. Starch and gelatin compositions in aqueous medium have been applied for most textile purposes. In the event that the fibers are to be used ultimately as a reinforcement or as a base for resinous plastics or coated fabrics, a size more receptive to such resinous materials may be applied, such as a methacrylato chromic complex of the Werner type, an unsaturated cationic amine salt, or an organo-silicon compound. Although glass fibers sized with the above compositions have been considered satisfactory, it has been found that they generally are low in abrasion resistance. As a result, during twisting or plying, an objectionable degree of fuzziness is produced and the interbonded relation between filaments has been found to be insufficient to resist separation especially during rewinding operations from the drum upon which the strand originally is wound in forming.

An improved size capable of increasing the abrasion resistance of glass fibers and developing an improved bonded relation between the fibers has been compounded of a cationic dispersion of a polyamide resin of the type prepared by the condensation reaction of dimerized or trimerized vegetable oil acids with a polyamine, preferably a diamine of the type ethylene diamine. A preferred polyamide for use in the practice of this invention is prepared by the reaction of dimerized and trimerized linoleic and linolenic acids with ethylene diamine in substantially theoretical proportions.

Although the cationic dispersion of the polyamide resin in aqueous medium may be formed originally in concentrations generally ranging up to 50 percent by weight solids, dilution in substantially any amounts with water is possible. For application as a size, it is desirable to reduce the solids in the cationic dispersion to a range of 0.5 to 7.5 percent by weight. Instead of dilution with water, various solvents may be used, such as alcohols of the type methanol, ethanol and isopropyl alcohols or other organic solvents having limited solvency for the polyamide, such as benzene, toluene, xylene, cellosolve, ethyl acetate and the like.

The cationic polyamide formed by the reaction of dimerized and trimerized oil acids with ethylene diamine may be advantageously modified with small amounts of other resins to increase its water resistance, flexibility, adhesion and resistance towards blocking, such for example as by the addition of an alkyd resin, coumarone indene resin, oil modified phenolic resins, rosin and rosin derivatives and the like. Other waxy materials and plasticizers, such as dibutyl phthalate, tricresyl phosphate, castor oil, mineral waxes, paraffins and the like may also be introduced in small amounts as modifiers for the polyamide to improve its physical properties.

Application to the glass fibers may be made, as previously described, by roll applicator or by wiping the composition onto the fibers as they are formed and gathered into bundles. In the event that application is to be made to fibers which have already been formed and treated with other coatings, the glass fibers should be cleaned by burning off the coating at elevated temperature or by washing the coating off with water or other suitable solvent and the size composition applied to the clean glass fiber filaments and then gathered into bundles.

The reason that it is desirable to apply the size composition in forming or onto clean glass filaments formed of the strands or yarns is because the cationic suspensoid dries in a manner to deposit the polyamide as fine particles which are able to orient themselves with the groupings that predominate on the clean glass fiber filaments. The particles of polyamide are also physically held within the fiber bundles by the surrounding filaments until the polyamide is heated to a temperature sufficient to fuse the polyamides into a coating which substantially covers the filaments throughout their lengths. Thus, in practice, the dispersion is applied to the glass fiber filaments and the bundles of fibers that are formed are wound wet upon the winding drum. The drum is either allowed to air dry or else placed while wet in a suitable drying oven heated to a temperature to drive off the diluent and fuse the polyamide in situ on the glass fiber surfaces.

Heating for fusion may be carried out at a temperature in excess of 225° F., but below the temperature at which decomposition of the organic resin takes place and preferably within a range of 250–350° F. for a time ranging from 10 minutes to 2–3 hours depending upon the temperature, the mass of fibers on the winding drum and the amount of moisture to be first driven off.

Since the polyamide is in a cationic suspension, it is believed that the solids become highly attracted almost immediately to the negative groups that predominate on the glass fiber surfaces whereby orientation occurs sufficient to minimize separation and cause the particles, even though they might no be physically held within the fiber bundles by surrounding filaments, to remain in place on the fiber surfaces. The attraction which develops between the cationic polyamide and the negative groups on the glass fiber surfaces further provides for a bonded relation therebetween which upon fusion of the polyamide into a coating is substantially preferentially held to the glass fiber surfaces markedly to improve the abrasion resistance and strength of the glass fibers as well as to improve their bonded relation one to another in the formed strand or yarn.

As a result of the characteristics developed by the glass fibers sized with a cationic polyamide in accordance with the practice of this invention, the glass fiber bundles, in strand or yarn form, after fusion, can be removed by unwinding from the outside of the tube or package formed in the ordinary twisting operation for yarn manufacture, or they can be drawn from the inside of the package for rewinding upon a cone with little, if any, evidence of split fibers or separated fiber filaments, such as is characteristic of bundles sized with compositions of the type heretofore employed.

Although the use of a lubricant in combination with the cationic polyamide is not necessary, markedly improved results are secured, especially where lubricity is a requirement, by the incorporation of a lubricant in the form of a cationic compound in combination with the polyamide in the size composition. Suitable cationic lubricants for use in combination with the cationic polyamide may be present in amounts ranging from 0.2 to 2.0 percent by weight of the size composition and may be selected from quaternary ammonium compounds formed with fatty acid groups of relatively long carbon length, such as cetyl dimethyl benzyl ammonium chloride, dicoco dimethyl ammonium chloride, laurylamine acetate, stearylamine chloride, tetraethylene pentamine reaction products with fatty acids neutralized with acetic acid or other cationic lubricating compounds of the type described in the Sloan Patents Nos. 2,338,206 and 2,356,542.

In practice, a polyamide prepared by the reaction of dimerized and trimerized linoleic and linolenic acids with ethylene diamine is formed into a cationic dispersion in water in amounts ranging to about 4 percent by weight. One percent by weight cetyl dimethyl benzyl ammonium chloride is added as a lubricant and the size applied by roll applicator to the glass fiber filaments in forming. From the roll applicator, the wet fibers are gathered into a strand and wound upon a winding drum to form what is referred to as a package. The size may be allowed to dry while on the winding drum or in the package but the deposited dry particles of polyamide resin do not become lost in any dangerous amounts because of their orientation with the glass fiber surfaces and because they are entrapped within the fiber bundle.

Thereafter the package or drum is heated to a temperature of 250° F. for 1–2 hours to drive off the water and fuse the polyamide in situ on the glass fiber surfaces. During fusion, the size passes through an adhesive stage and is present in sufficient amount to fuse the filaments one to another in the yarn and prevent separation in use, as previously described.

Excellently sized fibers, having good abrasion resistance and strength, which make them suitable for many purposes where lubricity is not a requirement, may be prepared of a formulation of the type previously described but without the lubricant as an ingredient therein. The subsequent treatment to dry and fuse the polyamide resin remains substantially the same.

It will be apparent from this description that I have provided a new and improved size composition which may be applied and subsequently treated in an expedient manner to form glass fibers in the form of yarns and bundles having improved abrasion resistance, improved strength, and improved bonded relation between the size and the glass fiber surfaces and between the fibers in the bundle so as to resist inadvertent separation during normal handling and use. Glass fibers sized in accordance with the practice of this invention may advantageously be used as a reinforcement for plastics, as a base for coated fabrics or as a strand or yarn in the fabrication of improved textile materials.

It will be understood that the amounts of lubricant and polyamide resin may vary within the limitations prescribed in the example given and that various cationic lubricants may be substituted, if desired, in the formulation. It will be further understood that changes may be made in the details of application and subsequent treatment of the size composition onto the glass fibers without departing from the spirit of the invention, especially as defined in the following claims.

I claim:

1. In the method of sizing glass fibers to form strands, the steps of coating the glass filaments before being arranged in strand formation with a cationic dispersion of a polyamide resin to deposit the polyamide resin as fine particles on the surfaces of the glass filaments, and then heating the filaments when in strand form at a temperature sufficient to dry and fuse the particles of polyamide resin to coat the filaments substantially throughout their lengths and bind the filaments together in the strand.

2. In the method of sizing glass fibers to form strands, the steps of coating glass filaments before they are arranged in strand formation with a size comprising a cationic dispersion of a polyamide resin and a lubricant to deposit the polyamide resin as fine particles on the surfaces of the glass filaments, and then heating the filaments when in strand form at a temperature sufficiently high to dry and fuse the particles of polyamide resin but below that at which decomposition takes place whereby the size coats the fibers substantially throughout their lengths and binds the filaments together in the strand.

3. In the method of sizing glass fibers to form strands, the steps of coating glass filaments before being arranged in strand formation with an aqueous size composition containing a cationic dispersion of a polyamide resin present in amounts ranging from 0.5–7.5 percent by weight of the dispersion and a lubricant present in amounts ranging from 0.2–2.0 percent by weight of the dispersion to deposit the polyamide resin as fine particles on the surfaces of the glass filaments, heating the sized filaments to a temperature within the range of 225–350° F. for a time sufficient to dry and fuse the particles of polyamide resin whereby the resin coats the glass fibers substantially throughout their lengths and binds the filaments together in the strand.

4. An article of manufacture prepared by the method of claim 1 and comprising a plurality of glass fiber filaments sized with a lubricant and a fused cationic polyamide resin formed by the reaction of a polyamine with fatty acids selected from the group of dimerized and trimerized fatty acids and mixtures thereof coating the filaments substantially throughout their lengths and bonding the filaments one to another in a strand.

5. An intermediate product of manufacture comprising a plurality of glass fibers in the form of a bundle in which the surfaces of the glass fibers are covered with particles of a cationic polyamide resin which are held onto the glass fiber surfaces by ionic attraction and by adjacent fibers in the bundle.

6. In the method of sizing glass fibers with a polyamide resin, the step of treating the glass fibers with a cationic dispersion of a polyamide resin in finely divided form to deposit the polyamide resin as fine particles on the glass fiber surfaces and fusing the particles of polyamide resin in situ on the glass fiber surfaces.

7. In the method of treating glass fibers to form strands, the steps of coating glass filaments before being arranged in strand formation with a cationic dispersion of a polyamide resin present in amounts within the range of about 0.5–7.5 percent by weight of the dispersion to deposit the polyamide resin as fine particles on the surfaces of the glass filaments, heating the coated strands at a temperature within the range of 225–350° F. until the diluent is driven off and the particles of polyamide resin are fused to coat the fibers substantially throughout their lengths and bind the filaments together in strands.

8. In the method of sizing glass fibers to form strands, the steps of coating glass filaments before being arranged in strand formation with an aqueous size composition containing a cationic dispersion of a polyamide resin formed by the reaction of a diamine with a fatty acid selected from the group of dimerized and trimerized fatty acids and mixtures thereof and present in amounts ranging from 0.5–7.5 percent by weight of the dispersion and a lubricant present in amounts ranging from 0.2–2.0 percent by weight of the dispersion to deposit the polyamide resin as fine particles on the surfaces of the glass filaments, heating the sized filaments to a temperature within the range of 225–350° F. for a time sufficient to dry and fuse the particles of the polyamide resin whereby the fused resin coats the glass fibers substantially throughout their lengths and binds the filaments together in the strand.

9. An intermediate product of manufacture produced by the method of claim 8 comprising a plurality of glass fibers in strand formation having particles on the surfaces thereof deposited from a cationic dispersion of polyamide resin formed by the reaction of a polyamine with a fatty acid selected from the group consisting of dimerized and trimerized fatty acids and mixtures thereof.

10. An intermediate product as claimed in claim 5 which includes a lubricant present in combination with the cationic particles on the glass fiber surfaces.

References Cited in the file of this patent
UNITED STATES PATENTS

| | | |
|---|---|---|
| 2,234,986 | Slayter et al. | Mar. 18, 1941 |
| 2,260,024 | Hall et al. | Oct. 21, 1941 |
| 2,354,110 | Ford et al. | July 18, 1944 |
| 2,392,805 | Biefeld | Jan. 15, 1946 |
| 2,495,172 | Leape | Jan. 17, 1950 |
| 2,531,571 | Hyde | Nov. 28, 1950 |
| 2,671,744 | Biefeld et al. | Mar. 9, 1954 |
| 2,723,208 | Morrison | Nov. 8, 1955 |